(12) United States Patent
Vannatta et al.

(10) Patent No.: US 6,421,379 B1
(45) Date of Patent: Jul. 16, 2002

(54) DIGITAL FILTER WITH ADAPTIVE COEFFICIENTS

(75) Inventors: Louis Jay Vannatta; William P. Alberth, Jr., both of Crystal Lake; Terrie L. Frane, Bloomingdale, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/320,041

(22) Filed: May 26, 1999

Related U.S. Application Data

(63) Continuation of application No. 08/694,004, filed on Aug. 8, 1996, now Pat. No. 5,930,299.

(51) Int. Cl.[7] .................................................. H03H 7/30
(52) U.S. Cl. ...................................... 375/229; 375/231
(58) Field of Search .............................. 375/229, 230, 375/231, 232, 350; 708/322, 323; 333/18, 28 R (56) References Cited

U.S. PATENT DOCUMENTS

| 4,646,327 A | | 2/1987 | Kojima et al. | |
|---|---|---|---|---|
| 4,656,644 A | * | 4/1987 | Ozaki | 375/232 |
| 4,766,561 A | | 8/1988 | Thompson et al. | |
| 4,837,723 A | | 6/1989 | Peacock | |
| 5,182,633 A | | 1/1993 | Antonio et al. | |
| 5,303,263 A | * | 4/1994 | Shoji et al. | 375/232 |
| 5,311,459 A | | 5/1994 | D'Luna et al. | |
| 5,617,450 A | * | 4/1997 | Kakuishi et al. | 375/230 |
| 5,648,988 A | * | 7/1997 | Iwamatsu et al. | 375/232 |
| 5,671,252 A | * | 9/1997 | Kovacs et al. | 375/316 |

\* cited by examiner

*Primary Examiner*—Don N. Vo
(74) *Attorney, Agent, or Firm*—Sylvia Y. Chen; Matthew C. Loppnow (57) ABSTRACT

When an input digital signal, having a portion with an associated control value, is connected to a digital filter with adaptive compensation, the digital filter with adaptive compensation selects one of a plurality of coefficient scalers (9501, 9601) as directed by a control bus (990). As the input digital signal propagates through the filter, one of a plurality of next coefficient scalers (9502,9602) are selected by the control bus (990). The digital filter with adaptive compensation interleaves in time the coefficients of multiple conventional filters in order to filter each portion of the digital signal according to its associated control value.

18 Claims, 10 Drawing Sheets

DIGITAL FILTER WITH ADAPTIVE COEFFICIENTS

CROSS REFERENCE TO RELATED APPLICATION

The present application is based on prior U.S. application Ser. No. 08/694,004, filed on Aug. 8, 1996, which is now U.S. Pat. No. 5,930,299, which is hereby incorporated by reference, and priority thereto for common subject matter is hereby claimed.

FIELD OF THE INVENTION

The present invention relates generally to digital filters, and more particularly to time-interleaving coefficients of a digital filter.

BACKGROUND OF THE INVENTION

Digital modulation schemes, such as $\pi/4$ differential quadrature phase shift keying ($\pi/4$ DQPSK), are used in transmitters for North American Digital Communications (NADC) and Personal Digital Communications (PDC) wireless communication systems. Alternative digital modulation techniques used in other wireless communication systems include other variations of quadrature-amplitude modulation (QAM) such as 64-QAM, 16-QAM, and QPSK. A conventional $\pi/4$ DQPSK modulator includes an encoder, finite-duration impulse response (FIR) pulse shaping filters for in-phase and quadrature (I/Q) signals, and a quadrature modulator.

Both NADC and PDC use square root raised cosine (SRRC) FIR pulse shaping filters to limit the bandwidth of the transmitted signal and limit interference with adjacent frequency channels. Unfortunately, these FIR pulse shaping filters also impart amplitude modulation onto the transmitted waveform. This amplitude modulation may be characterized by a peak-to-average power ratio. Higher peak-to-average power ratios result in decreased radio frequency (RF) power amplifier efficiency, because the RF power amplifier in the transmitter must remain substantially linear over the full range of the signal envelope. In a portable device, the RF power amplifier is a major source of power consumption, and reduced efficiency has a significant impact on battery life. Additionally, the cost of a linear amplifier increases as the peak power of the transmitted signal increases.

Thus, there is a need for a digital modulator that produces a modulated signal with a reduced peak-to-average power ratio to decrease both power consumption and cost in a communication system transmitter.

DETAILED DESCRIPTION OF THE PREFERRED EMBODIMENTS

A digital modulator with compensation reduces the peak-to-average power ratio of a modulated signal to allow an increase in power amplifier efficiency. The modulator also reduces adjacent channel power (ACP) interference. In the digital modulator with compensation, a digital bit stream is sent to an encoder which translates bit sequences into I/Q digital pulses. A symbol correlater notes when target symbol sequences enter the encoder. These target symbol sequences have been predetermined to cause excessive amplitude peaking in the modulated signal.

If a target symbol sequence is encountered, it is adjusted using amplitude or filter compensation. The compensation is implemented by adjusting the coefficients of I/Q FIR pulse shaping filters for one or more symbols in each target symbol sequence. Non-target symbol sequences in the digital bit stream are largely unaffected. The I/Q FIR pulse shaping filters are followed by I/Q digital-to-analog converter (DAC) and reconstruction filters, and together the filters shape the I/Q pulses according to communication system specifications. The filtered I/Q signals are then sent to a quadrature modulator for RF modulation, amplified, and transmitted over a communication channel.

Compensation of target symbol sequences reduces the impact the target symbol sequence has on the peak-to-average power ratio. By reducing the impact of target symbol sequences on the peak-to-average power ratio, the efficiency of the power amplifier can be increased and the battery life of portable communication equipment may be extended.

Figure 1:
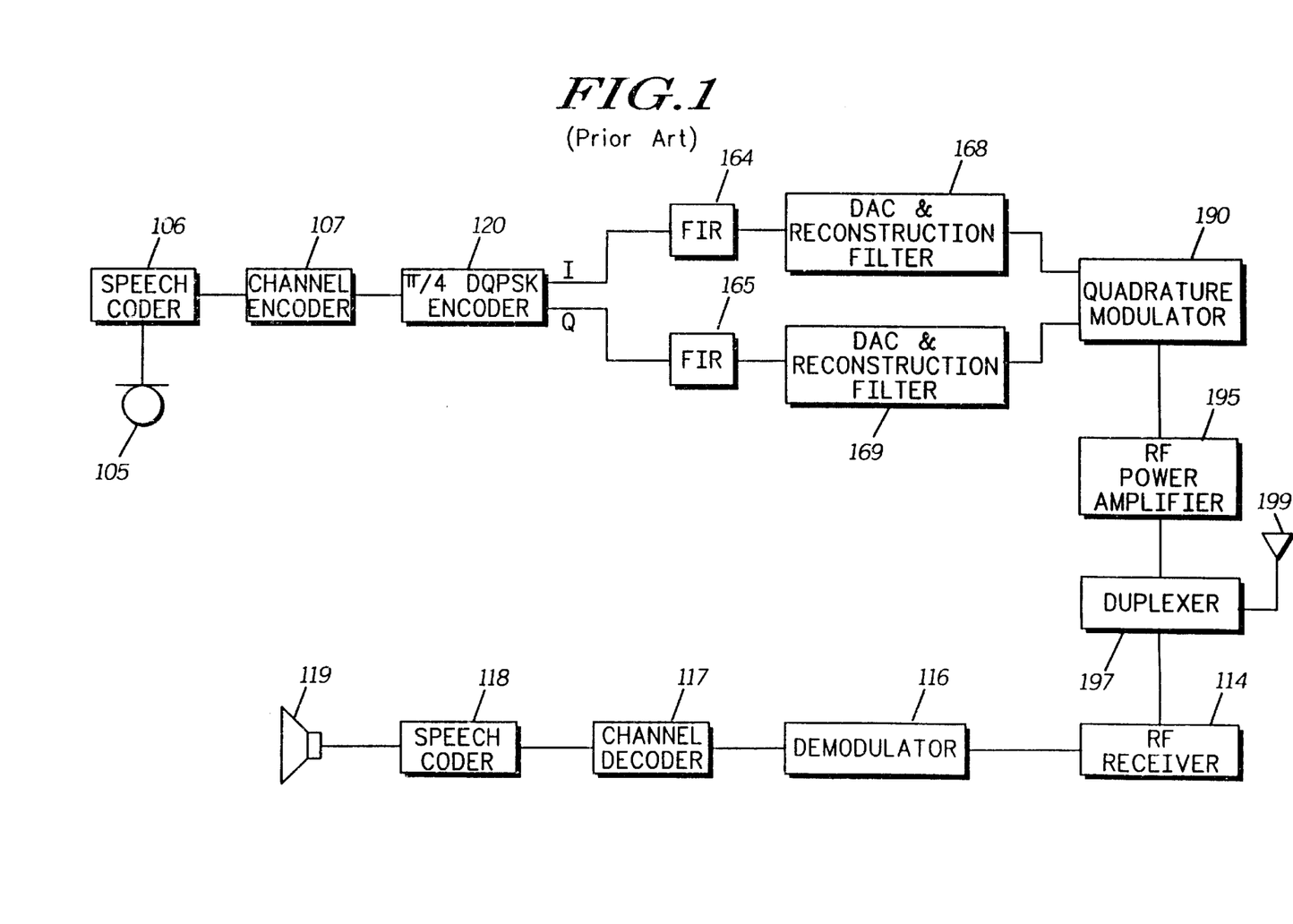
FIG. 1 shows a block system diagram of a prior art $\pi/4$ DQPSK digital modulator as implemented in a communication system.

FIG. 1 shows a block system diagram of a prior art $\pi/4$ DQPSK digital modulator as implemented in a communication system. An analog input signal from a microphone 105 is processed through a speech coder 106 and a channel encoder 107 into the digital domain. A digital bit stream then enters $\pi/4$ DQPSK encoder 120 which converts two-bit symbol sequences into I/Q digital pulses with $\pm\pi/4$ or $\pm 3\pi/4$ phase shift keying. An in-phase (I) signal enters an FIR pulse shaping filter 164 that shapes the incoming digital pulses into Nyquist pulse shapes such as an SRRC pulse having $\alpha=0.5$, which is a requirement of the PDC system. The quadrature (Q) signal goes to FIR pulse shaping filter 165 which is identical to FIR pulse shaping filter 164. Both filtered I/Q signals are further processed through I/Q digital-to-analog converter (DAC) and reconstruction filters 168, 169. Next, the signals enter quadrature modulator 190 for modulation onto an RF carrier. A linear RF power amplifier 195 amplifies the modulated signal, and duplexer 197 and antenna 199 enable transmission of the modulated signal across a wireless communication channel.

In the receiver portion of the communication system, antenna 199 receives a modulated signal from a complementary communication device, and duplexer 197 directs the signal to RF receiver 114, demodulator 116, channel decoder 117, and speech coder 118. Audio speaker 119 then plays the baseband signal from speech coder 118.

Figure 2:
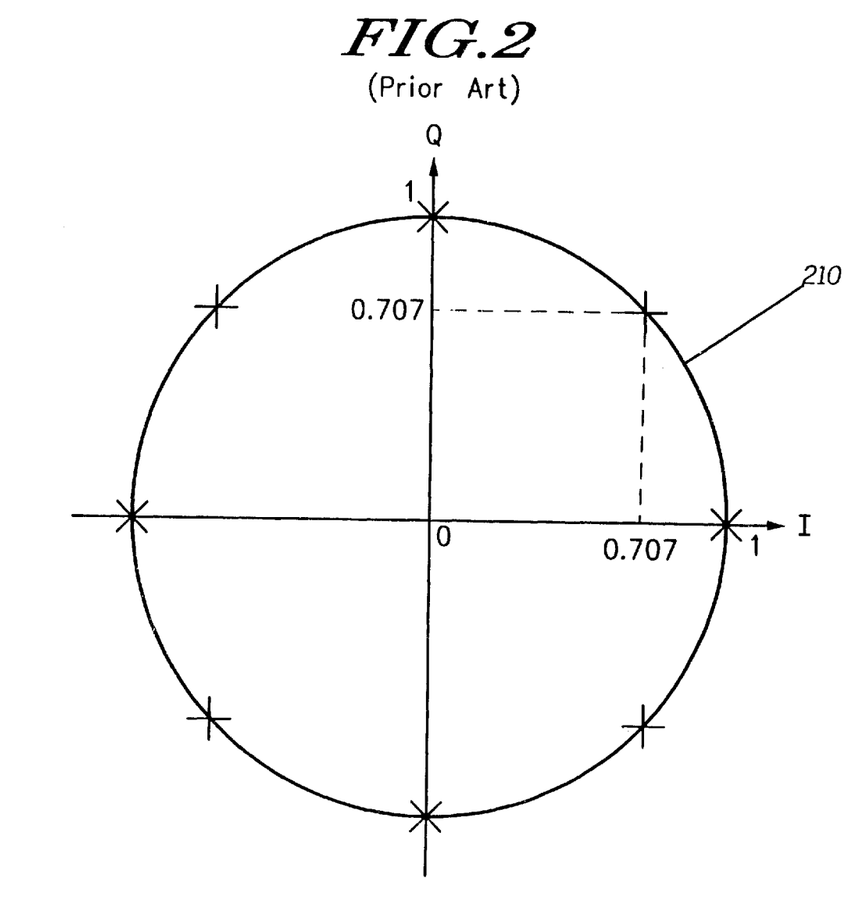
FIG. 2 shows a phase constellation of a prior art $\pi/4$ DQPSK digital modulator at the inputs to I/Q FIR pulse shaping filters.

FIG. 2 shows a phase constellation of a prior art π/4 DQPSK digital modulator at the inputs to I/Q FIR pulse shaping filters 164, 165 shown in FIG. 1. There are eight allowed values for the output of the π/4 DQPSK encoder 120 shown in FIG. 1. The allowed values fall on the unit circle 210 at angles that are multiples of 45 degrees.

Figure 3:
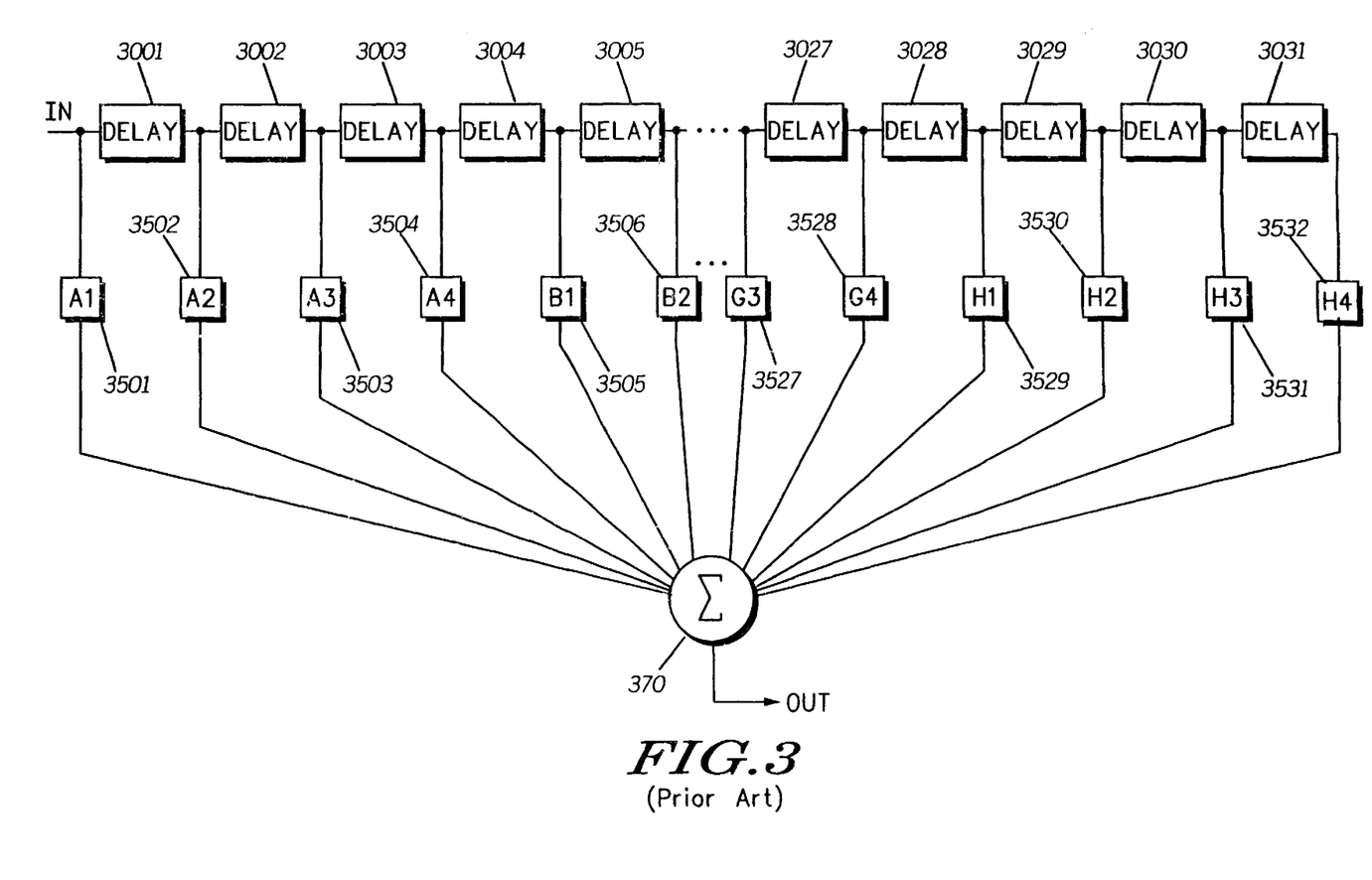
FIG. 3 shows a block diagram of a finite-duration impulse response filter for use in a prior art $\pi/4$ DQPSK digital modulator.

FIG. 3 shows a block diagram of a finite-duration impulse response filter for use in a prior art π/4 DQPSK digital modulator. I/Q FIR pulse shaping filters 164, 165 shown in FIG. 1 implement FIR filters which use delay elements, scalers, and a summer to process an incoming signal. This example shows a thirty-two-tap FIR filter with four-times oversampling. The oversampling method contemplated here is adding three zero symbols between each input symbol, commonly called zero-stuffing, to create an input signal to the filter. The input signal is supplied, in sequence, to delay elements 3001–3031. An undelayed signal is tapped off, scaled by coefficient scaler 3501, and sent to summer 370. A first delayed signal is tapped off after delay element 3001, scaled using coefficient scaler 3502, and also sent to summer 370. This delay-and-scale procedure occurs thirty more times through delay elements 3002–3031 and coefficient scalers 3503–3532. The coefficient scalers 3501–3532 have values corresponding to the desired SRRC impulse response of the filter, and the values are symmetrical about the center of the filter. In other words, the value A1 in coefficient scaler 3501 is equal to the value H4 in coefficient scaler 3532, the value A2 in coefficient scaler 3502 is equal to the value H3 in coefficient scaler 3531, the value A3 in coefficient scaler 3503 is equal to the value H2 in coefficient scaler 3530, and so on. Thus, there are only sixteen unique filter coefficients. The output signal at the summer 370 represents the convolution of the input signal with the impulse response of the filter. FIR filters, however, can be implemented in another, less computationally intensive way as shown in FIG. 4.

Figure 4:
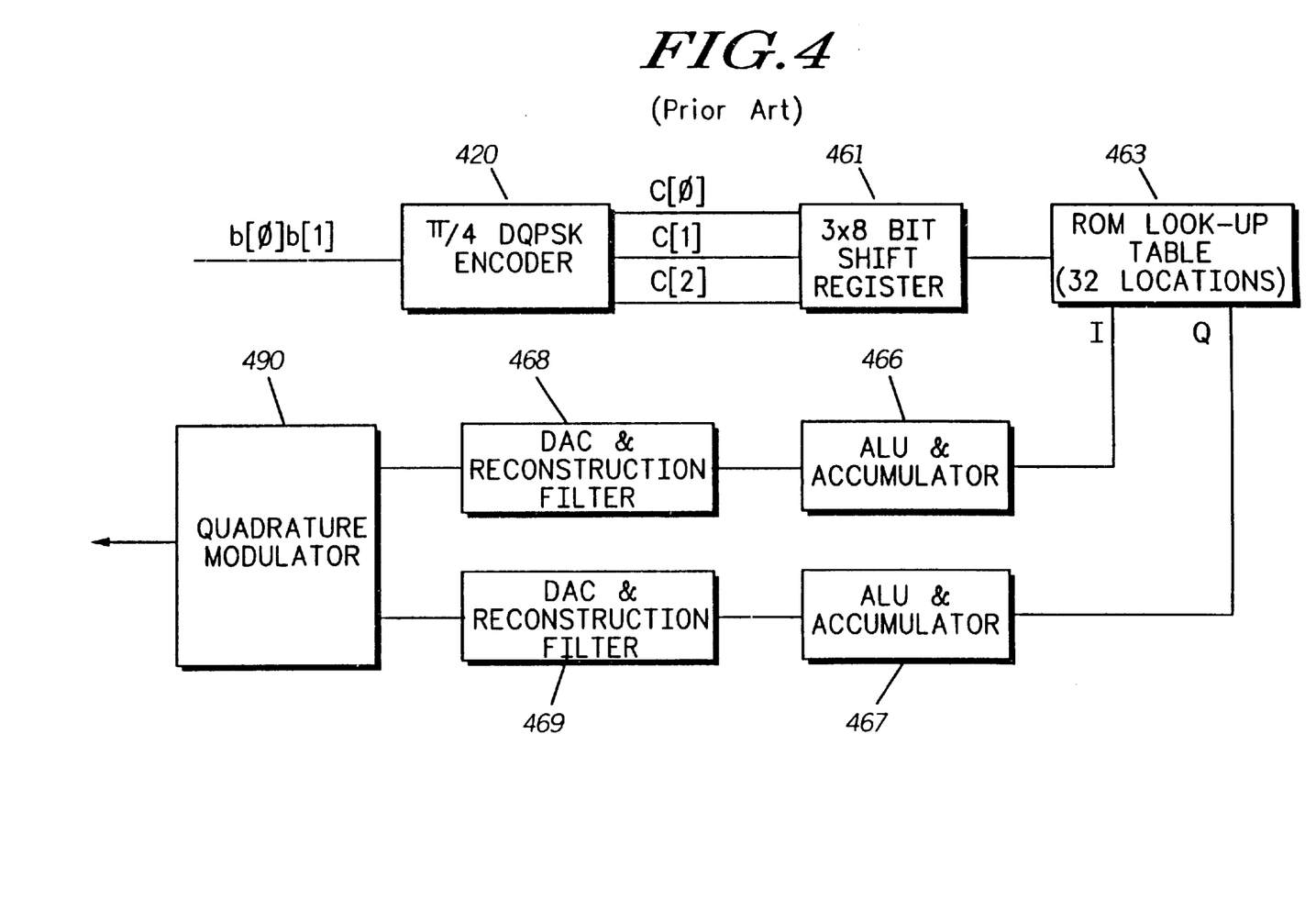
FIG. 4 shows a block diagram of a prior art $\pi/4$ DQPSK digital modulator.

FIG. 4 shows a block diagram of a prior art π/4 DQPSK digital modulator. A π/4 DQPSK encoder 420 takes two input bits at a time from a digital bit stream and converts them into a phase shift keying word. Because in π/4 DQPSK the phase of a symbol can occupy only one of eight values as shown in FIG. 2, a three-bit digital word c[0], c[1], c[2] can represent the phase of the symbol. Eight three-bit phase words are collected in a three-by-eight shift register 461. The eight columns in the shift register are used to implement a thirty-two-tap FIR filter with four-times oversampling. Instead of using an actual thirty-two-tap FIR filter as shown in FIG. 3 to delay, scale, and sum the digital words, a read-only memory (ROM) look-up table 463 with thirty-two locations and I/Q arithmetic logic units (ALU) and accumulators 466, 467 simulate the functions of an FIR filter.

As each of the eight words from the shift register 461 enter ROM look-up table 463, one of thirty-two values is retrieved from the table. Each of the thirty-two values represents one of the two possible non-zero magnitudes of the π/4 DQPSK encoded I/Q signals multiplied by one of the sixteen unique FIR filter coefficients. The magnitude of a π/4 DQPSK encoded signal is either 0, 0.707, or 1 as shown in FIG. 2. Because zero multiplied by any value is zero, the ROM look-up table 463 need only contain products of 0.707 or 1 multiplied by each of the possible coefficient values of a filter impulse response function.

As each value exits the ROM look-up table 463, it is sent either to an in-phase ALU and accumulator 466 or a quadrature ALU and accumulator 467 which performs the summing function in an FIR filter. The output of the ALU and accumulators are sent to I/Q DAC and reconstruction filters 468, 469. Due to digital domain processing, the outputs of the ALU and accumulators benefit from the smoothing action of reconstruction filters. The outputs of DAC and reconstruction filters 468, 469 go to quadrature modulator 490 which modulates the signals onto an RF carrier. As stated previously, the AM component in the modulated signal creates a high peak-to-average ratio and forces a reduction in power amplifier efficiency.

Figure 5:
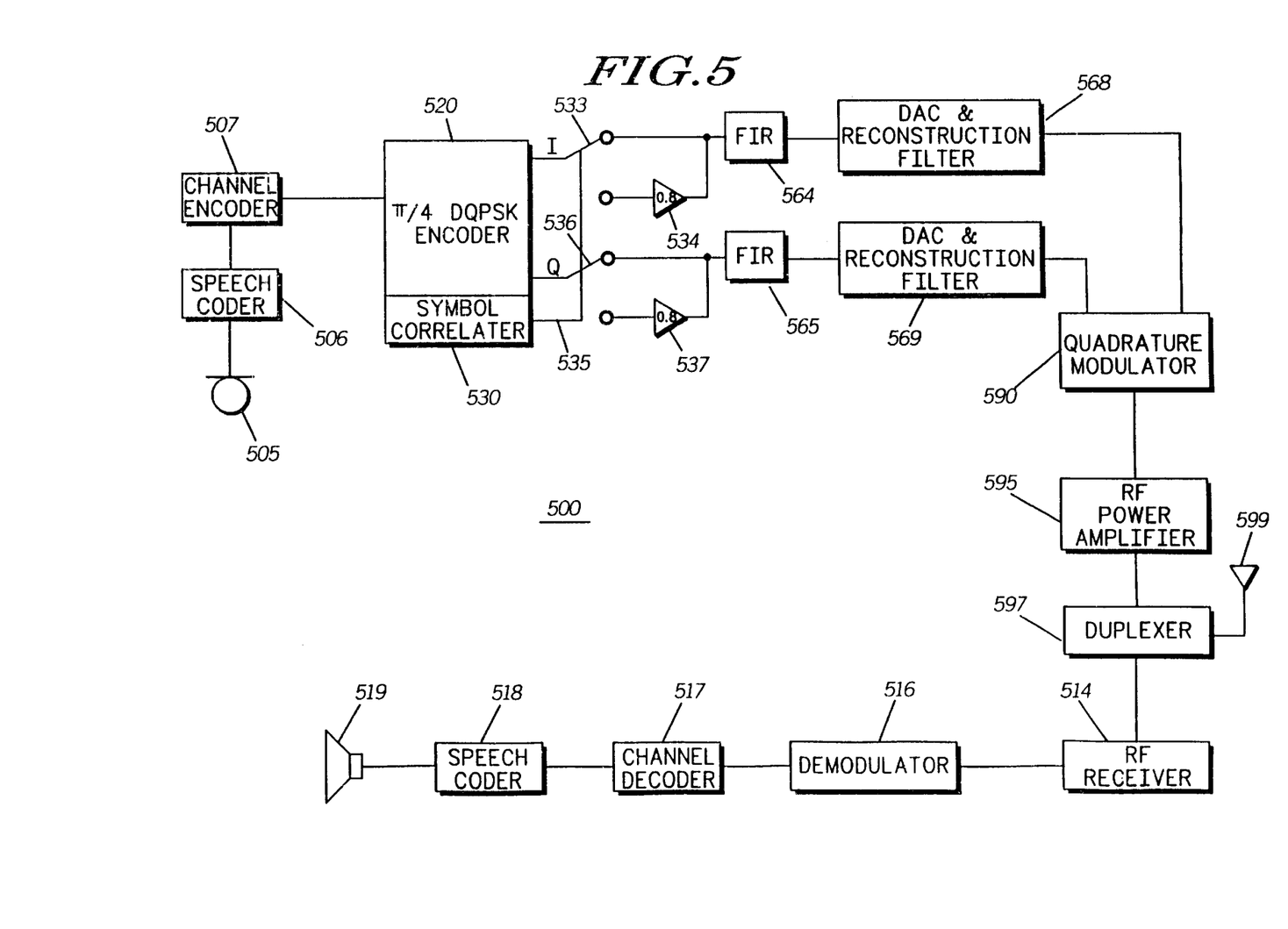
FIG. 5 shows a block system diagram of a digital modulator with amplitude compensation according to a preferred embodiment as implemented in a communication device.

FIG. 5 shows a block system diagram of a digital modulator with amplitude compensation according to a preferred embodiment as implemented in a communication device. The communication device 500 shown here is a radiotelephone, however, other communication devices may implement a digital modulator with compensation, such as a television, a modulator-demodulator (MODEM), a pager, or the like. A digital modulator with amplitude compensation reduces or increases the magnitude of symbols in certain predetermined target symbol sequences to reduce the peak-to-average ratio. In this embodiment, the encoder is a π/4 DQPSK encoder and the compensation is performed by scaling the magnitude of a central symbol in three-symbol target symbol sequences by 0.8 to reduce the peak-to-average power ratio of the modulated signal. The scaler may be an allpass filter having a gain of 0.8. Of course, other encoders and other compensation schemes may be substituted for the ones shown in this example.

A microphone 505 receives an analog audio signal and speech coder 506 and channel encoder 507 convert this audio signal to the digital domain. The digital bit stream, either serial or parallel, enters π/4 DQPSK encoder 520 which converts two input bits at a time into I/Q phase shift keying words, each having one of eight possible phase values. A symbol correlater 530, preferably implemented using logic gates, examines an input signal looking for symbol sequences that cause excessive amplitude peaks in the AM envelope of the modulated waveform. Note that the symbol correlater can examine either the signal sent to the encoder 520 or the encoded signal for target symbol sequences. Target symbol sequences may be determined to exceed a selected amplitude peak threshold using calculations or simulations or another method. The minimum length of the target symbol sequence is one symbol and there is no upper limit to the length of the target symbol sequence. As target symbol sequences increase in length, however, more hardware is required for symbol correlater implementation. In this example the target symbol sequences are chosen to be three symbols in length.

If a predetermined target symbol sequence is detected, symbol correlater 530 uses selection control line 535 to direct amplitude scaling of at least one symbol in the symbol sequence through amplifiers 534, 537 using switches 533, 536. In this embodiment, the magnitude of the second symbol in a target three-symbol sequence is reduced to 0.8 of the original magnitude using allpass filters as amplifiers 534, 537. Other scaling values may be used depending on the application. For example, in a MODEM application, low-magnitude symbols may be scaled up. In another example, a noise-free communication system would allow scaling of a symbol by 0.5 and less. Because the amplitude of the modulated signal carries no data information in π/4 DQPSK modulation, scaling a symbol's amplitude results in no information loss. If a predetermined target symbol sequence is not detected, the I/Q phase shift keying words pass to FIR pulse shaping filters 564, 565 unchanged.

Next, the composite I/Q signals, which are derived from a mixture of compensated and uncompensated symbols, pass through DAC and reconstruction filters 568, 569 and go to quadrature modulator 590 for RF modulation. The modulated signal is amplified using RF power amplifier 595 and transmitted through a communication channel using duplexer 597 and antenna 599. The amplitude compensation provided by amplifiers 534, 537 and controlled by symbol correlater 530 causes a reduction in the peak-to-average power ratio of the modulated signal at the output of quadrature modulator 590. Thus, the RF power amplifier efficiency may increase and the cost of the RF power amplifier may decrease.

The receiver portion of the communication device 500 is similar to the receiver portion shown in FIG. 1. Antenna 599 receives a modulated signal from a complementary communication device, and duplexer 597 directs the signal to RF receiver 514, demodulator 516, channel decoder 517, speech coder 518, and audio speaker 519.

Figure 6:
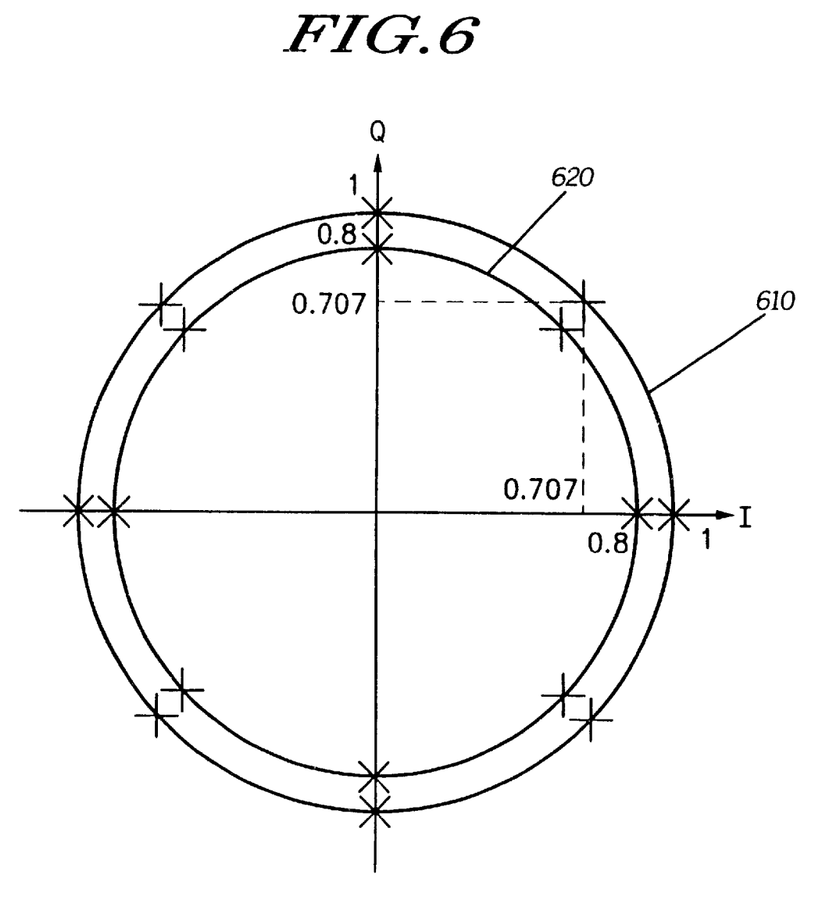
FIG. 6 shows a phase constellation of a $\pi/4$ DQPSK digital modulator with amplitude compensation according to a preferred embodiment at the inputs to I/Q FIR pulse shaping filters.

FIG. 6 shows a phase constellation of a π/4 DQPSK digital modulator with amplitude compensation according to a preferred embodiment at the inputs to I/Q FIR pulse shaping filters 564, 565 shown in FIG. 5. The eight allowed values on the unit circle 610 are exactly the same as the values shown in FIG. 2. The values on unit circle 610 represent uncompensated signals sent to FR pulse shaping filters 564, 565 shown in FIG. 5. Amp-litude-compensated signals from amplifiers 534, 537 shown in FIG. 5, on the other hand, fall on circle 620 which has a radius of 0.8 corresponding to the scaling value of the amplifiers.

Figure 7:
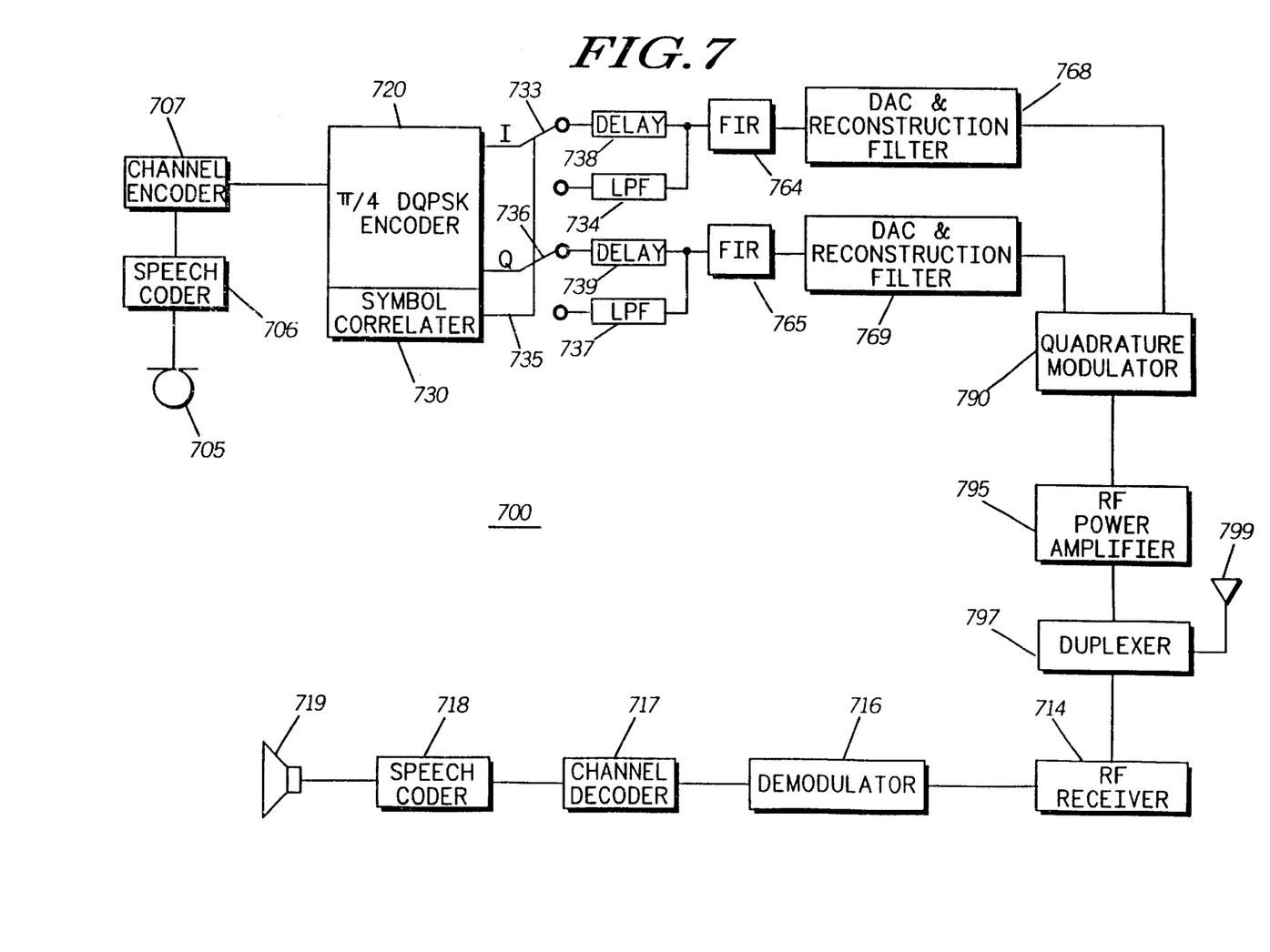
FIG. 7 shows a block system diagram of a digital modulator with filter compensation according to a preferred embodiment as implemented in a communication device.

FIG. 7 shows a block system diagram of a digital modulator with filter compensation according to a preferred embodiment as implemented in a communication device. Again, the communication device 700 is a radiotelephone but may be a television, a MODEM, a pager, or the like. Instead of imparting amplitude compensation to one or more symbols in a target symbol sequence as shown in FIG. 5, a digital modulator with filter compensation filters one or more symbols in a target symbol sequence to reduce the peak-to-average power ratio of the modulated signal. In this example, the encoder is a π/4 DQPSK encoder and the compensation is implemented by lowpass filtering a central symbol in three-symbol target symbol sequences. Of course, other encoders and other filtering schemes may be substituted for the ones shown in this example.

A speech coder 706 and a channel encoder 707 convert an analog audio signal from a microphone 705 to a digital signal. The digital signal is sent to π/4 DQPSK encoder 720 either serially or in parallel. The π/4 DQPSK encoder 720 takes two bits at a time from the input bit stream and converts them to a pulse stream having phase shift keying similar to the encoders described previously. A symbol correlater 730, preferably implemented using logic gates, analyzes one or more two-bit incoming digital words, either the input to the encoder 720 or the encoded signal, and recognizes target symbol sequences. The target symbol sequences represent sequences that have been predetermined to produce excessive amplitude peaks in the AM envelope of the modulated waveform. In this example, the symbol correlater looks for certain three-symbol target symbol sequences that contribute to the peak-to-average power ratio in the modulated signal.

The output of the correlater 730 through selection control line 735 controls switches 733, 736. If the correlater 730 detects a predetermined target symbol sequence, the switches connect the output of the encoder 720 to I/Q lowpass compensation filters (LPFs) 734, 737. Compensation filtering one or more symbols in the target symbol sequence reduces the peak value of the phase shift keying signal, and thus also reduces the peak value of the modulated RF waveform. Note that the phase of the targeted symbol may be distorted as well as the amplitude. Also, other symbols in the target symbol sequence might be affected by the compensation filtering. Of course, the bandwidth, poles, and gain of the compensation filter may be tailored for. each application. If no target symbol sequence is detected by correlater 730, the output of the encoder 720 simply passes through I/Q delay elements 738, 739, which have the same delay as LPFs 734, 737, to synchronize the signals at the inputs to I/Q FIR pulse shaping filters 764, 765.

Next, the composite I/Q signals, derived from a mixture of compensated and uncompensated symbols, pass through DAC and reconstruction filters 768, 769 and go to quadrature modulator 790, RF power amplifier 795, duplexer 797, and antenna 799 for transmission through a communication channel. The filter compensation provided by lowpass compensation filters 734, 737 and controlled by symbol correlater 730 causes a reduction in the peak-to-average power ratio of the modulated signal at the output of quadrature modulator 790. Thus, the RF power amplifier efficiency increases and the cost of the RF power amplifier may decrease.

The receiver portion of the communication device 700 is similar to the receiver portion shown in FIG. 1. Antenna 799 receives a modulated signal from a complementary communication device, and duplexer 797 directs the signal to RF receiver 714, demodulator 716, channel decoder 717, speech coder 718, and audio speaker 719.

Figure 8:
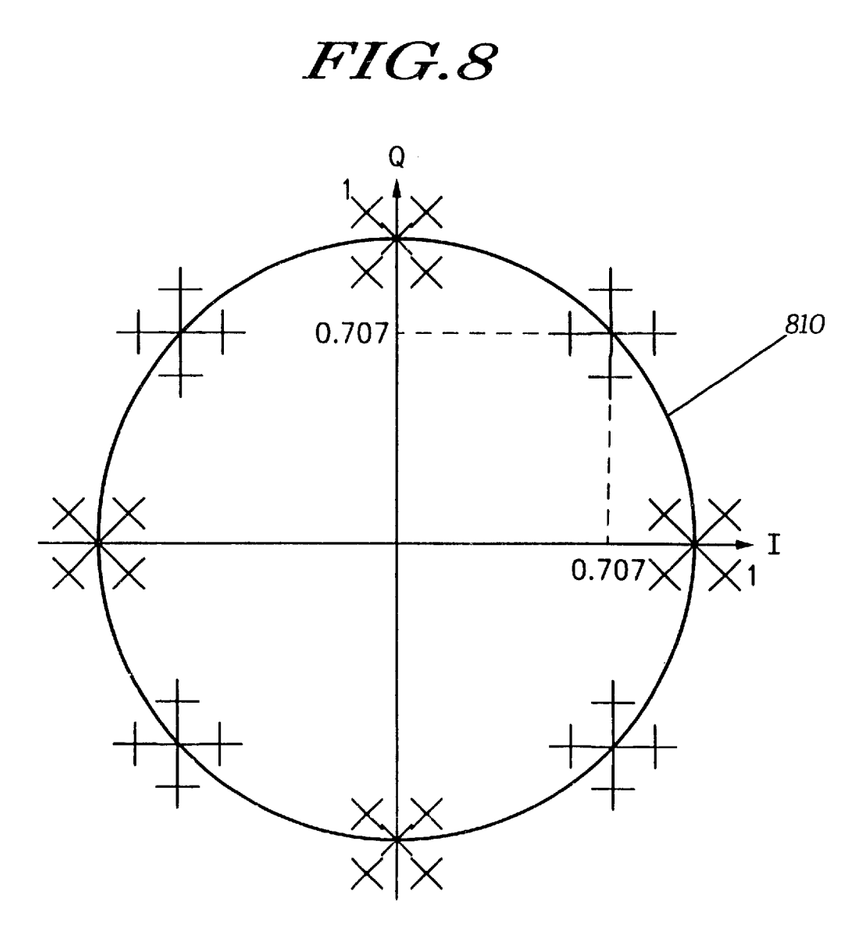
FIG. 8 shows a phase constellation of a $\pi/4$ DQPSK digital modulator with filter compensation according to a preferred embodiment at the inputs to I/Q FIR pulse shaping filters.

FIG. 8 shows a phase constellation of a π/4 DQPSK digital modulator with filter compensation according to a preferred embodiment at the inputs to I/Q FIR pulse shaping filters 764, 765 shown in FIG. 7. This phase constellation shows the slight distortion of phase and amplitude caused by filter compensation. There are a multitude of allowed values centered on the unit circle 810 around the eight allowed (uncompensated) values shown in FIG. 2. The I/Q compensation filters 734, 737 shown in FIG. 7 are chosen to avoid excessive phase or amplitude distortion so that the deviation from the ideal, uncompensated values, referred to as the error vector magnitude (EVM), never exceeds system specifications.

Figure 9:
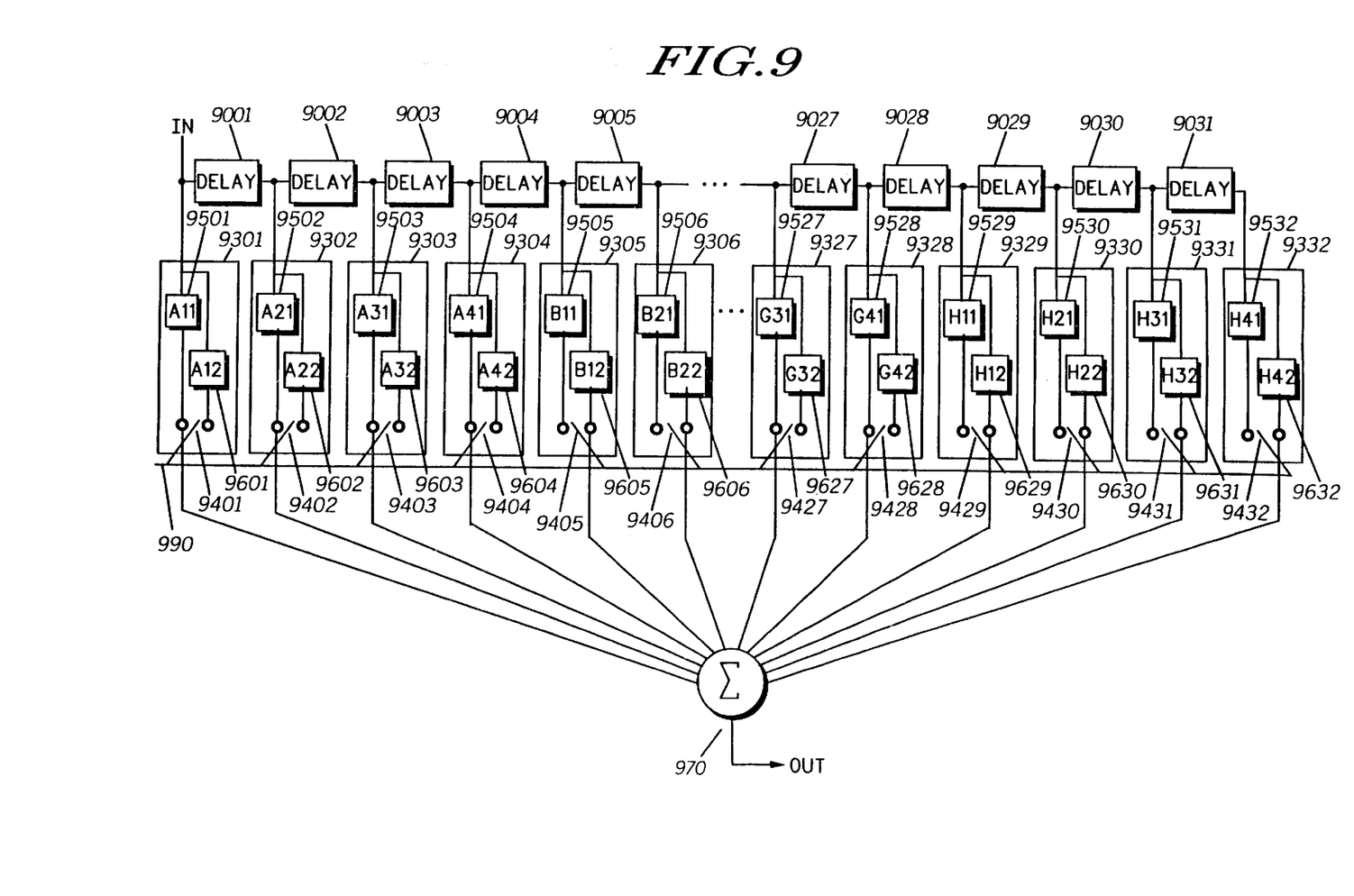
FIG. 9 shows a block diagram of a finite-duration impulse response filter for use in a $\pi/4$ DQPSK digital modulator with compensation according to a preferred embodiment.

FIG. 9 shows a block diagram of a finite-duration impulse response filter for use in a π/4 DQPSK digital modulator with compensation according to a preferred embodiment. A single in-phase FIR filter can implement the switched amplitude compensation and pulse shaping functions of switch 533, compensation amplifier 534, and FIR pulse shaping filter 564 shown in FIG. 5. A quadrature FIR filter can implement the switched amplitude compensation and pulse shaping functions of switch 536, compensation amplifier 537, and FIR pulse shaping filter 565. Alternatively, an in-phase FIR filter can implement the switched compensation filter and pulse shaping functions of switch 733, compensation filter 734, delay element 738, and FIR pulse shaping filter 764 shown in FIG. 7, and a quadrature FIR filter can implement the switched compensation filter and pulse shaping functions of switch 736, compensation filter 737, delay element 739, and FIR pulse shaping filter 765. This example shows a thirty-two-tap FIR filter with four-times oversampling for an uncompensated signal path and a compensated signal path through switches, compensation devices (either amplitude or filter compensation), and FIR pulse shaping filters.

An input signal is supplied, in sequence, to delay elements 9001–9031. An undelayed signal is tapped off, directed through circuit 9301, and sent to summer 970. A first delayed signal is tapped off after delay element 9001, directed through circuit 9302, and also sent to summer 970. This delay-and-scale procedure occurs thirty more times through delay elements 9002–9031 and circuits 9303–9332 to create a composite signal at the output of summer 970.

Each circuit 9301–9332 contains at least two coefficient scalers and a selection mechanism that is controlled by control bus 990. Concentrating on circuit 9301 as an example, a first coefficient scaler 9501 contains a value A11 representing an uncompensated filter coefficient similar to the value A1 shown in FIG. 3. Circuit 9301 also contains a second coefficient scaler 9601, which contains a value A12 representing a compensated filter coefficient (either amplitude compensation or filter compensation). A selection mechanism 9401, such as a two-pole switch controlled by a control bus 990, directs which scaled value is sent to the summer 970. The output of the summer 970 is a composite signal incorporating both compensated and uncompensated filter coefficients.

Although the selection mechanism 9401 is shown at the output of the pair of coefficient scalers 9501, 9601 to select one of two scaled signals, the selection mechanism may alternatively be moved to the input of the pair of coefficient scalers to determine which coefficient scaler receives an input from the delay line wherein the outputs of both scalers would be sent to the summer 970, or as another alternative two switches may be used where one is at the input to the pair of coefficient scalers and another is at the output of the pair of coefficient scalers. Circuit 9301 can be implemented in a variety of other ways to provide to the summer 970 with either an uncompensated or compensated filter coefficient scaled by the delay line signal. Also, with four-times oversampling implemented using zero-stuffing, each set of four selection mechanisms 9401–9404, 9405–9408, . . . , 9425–9428, 9429–9432 in the four-circuit sets 9301–9304, 9305–9308, . . . , 9325–9328, 9329–9332 could be controlled together.

Coefficient scalers 9501–9532 have values corresponding to the desired uncompensated impulse response of a filter; coefficient scalers 9601–9632 have values corresponding to the desired compensated impulse response of a filter. Thirty-two control signals on control bus 990 independently control each selection mechanism 9401–9432 so that each bit is consistently connected to either the uncompensated coefficient scalers 9501–9532 as it propagates through the filter or the uncompensated coefficient scalers 9601–9632 as it propagates through the filter. This filter shows a way to interleave in time two conventional FIR filters (one uncompensated, one compensated). This time-interleaved FIR filter, however, can be implemented in another, less computationally intensive way as shown in FIG. 10.

Figure 10:
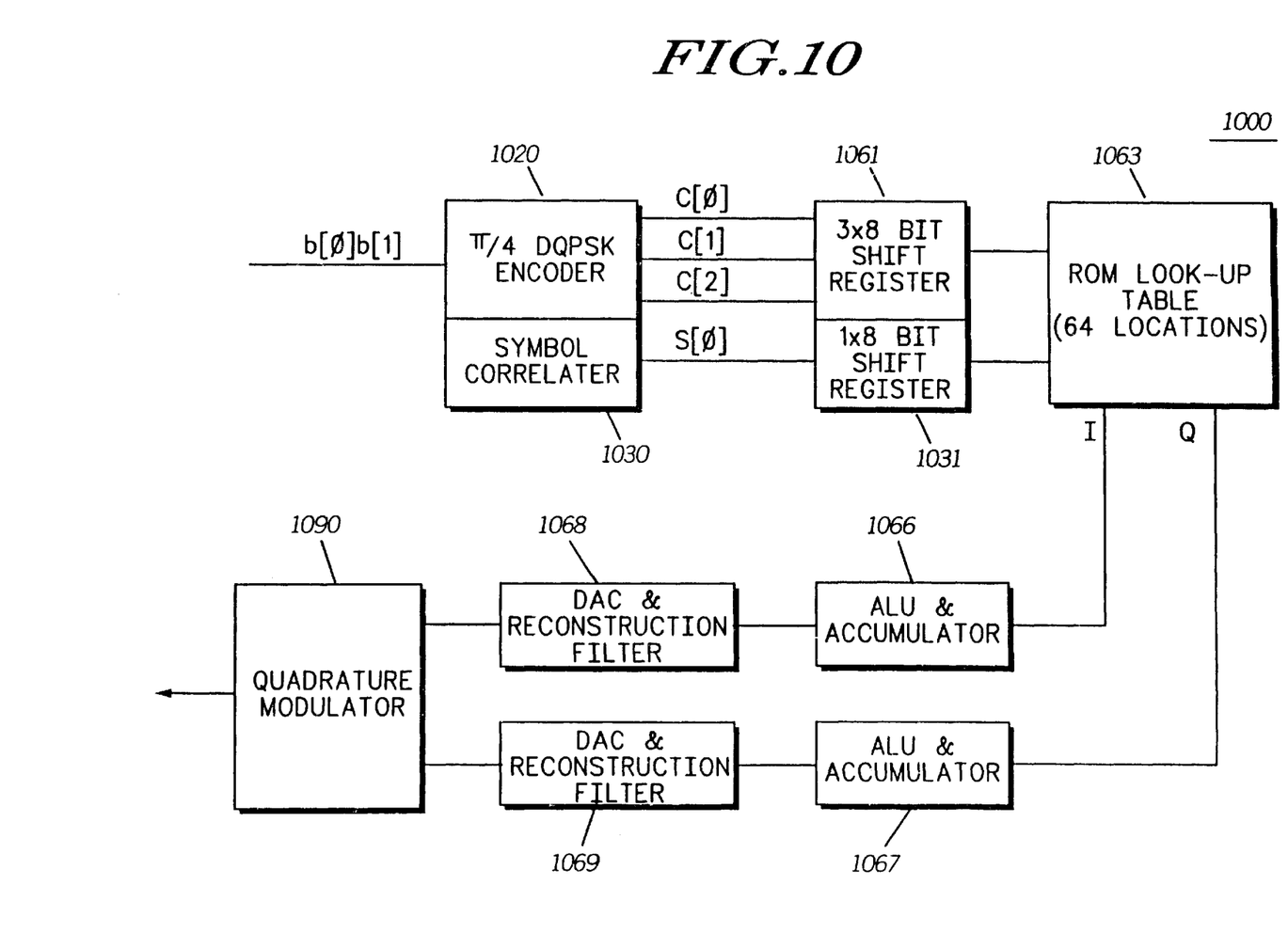
FIG. 10 shows a block diagram of a $\pi/4$ DQPSK digital modulator with compensation according to a preferred embodiment.

FIG. 10 shows a block diagram of a π/4 DQPSK digital modulator with compensation 1000 according to a preferred embodiment. A π/4 DQPSK encoder 1020 takes two input bits at a time and converts them into a phase shift keying word having three bits c[0], c[1], c[2], which defines one of the eight angles shown in FIG. 6 or FIG. 8. The input bit stream may be either serial or parallel. Symbol correlater 1030 inspects the incoming bits for predetermined target symbol sequences. If a target symbol sequence is encountered, an output bit s[0] from symbol correlater 1030 changes state, which indicates that a particular symbol should be compensated. Compensation may be either amplitude compensation or filter compensation. Eight three-bit phase words are collected in three-by-eight shift register 1061 and eight compensation bits are collected in one-by-eight shift register 1031. The eight columns in the shift register are used to implement an thirty-two-tap FIR filter with four-times oversampling.

Instead of using an actual FIR filter like the one shown in FIG. 9 to delay, scale, and sum the digital words, which is computationally intensive, a ROM look-up table 1063 with sixty-four locations and I/Q arithmetic logic unit (ALU) and accumulators 1066, 1067 simulate the functions of an FIR filter.

As each of the eight words from the shift register enter ROM look-up table 1063, one of sixty-four values is retrieved from the table. Thirty-two of the locations are the same as the thirty-two locations in look-up table 463 shown in FIG. 4; however, an additional thirty-two locations represent each of the two possible non-zero phase magnitudes multiplied by sixteen additional coefficients that implement pulse shaping with compensation. As each scaled term exits the ROM look-up table 1063, it is sent either to an in-phase ALU and accumulator 1066 or a quadrature ALU and accumulator 1067 which performs the summing function of an FIR filter. The output of the ALU and accumulators 1066, 1067 are sent to I/Q DAC and anti-aliasing filters 1068, 1069. The signals are then sent to quadrature modulator 1090 for modulation onto an RF carrier. The output of quadrature modulator 1090 has reduced AM components in the modulated signal which creates a lower peak-to-average ratio and allows increased power amplifier efficiency. Additionally, LPF compensation generally reduces ACP, however, amplitude compensation does not necessarily reduce ACP.

Note that implementation of compensation according to preferred embodiments requires minimal additional hardware. The EVM of the signal is generally increased by compensation, however, amplitude compensation affects the EVM more adversely than LPF compensation. The judicious selection of compensation coefficients for ROM look-up table 1063, however, can ensure that the EVM of the system does not exceed system specifications.

Also, the digital modulator can be expanded to implement multiple levels of compensation. For example, additional coefficient scalers can be added to each circuit 9301–9332 shown in FIG. 9 with an N-pole switch selecting between the outputs of uncompensated coefficient scalers, compensation-1 coefficient scalers, compensation-2 coefficient scalers, . . . , and compensation-N coefficient scalers as directed by control on control bus 990.

Thus a digital modulator with compensation retains the benefits of a conventional digital modulators while enabling reduction of the size and power consumption of the transmitter and improving adjacent channel power characteristics. While specific components and functions of the digital modulator with compensation are described above, fewer or additional functions could be employed by one skilled in the art within the true spirit and scope of the present invention. The invention should be limited only by the appended claims.

We claim:

1. A finite-duration impulse response filter comprising:
   a delay line have a first delay element, for receiving a digital signal having at least a first bit and a second bit;
   a first circuit, coupled to the delay line at an input to the first delay element, having:
      a first scaler;
      a second scaler; and
      a first selection mechanism, coupled between the first scaler and the second scaler, controlled by a first control signal;
   a second circuit, coupled to the delay line at an output to the first delay element, having:
      a third scaler;
      a fourth scaler; and
      a second selection mechanism, coupled between the third scaler and the fourth scaler, controlled by a second control signal; and
   a summer coupled to the first circuit and the second circuit,
   wherein the first control signal directs the first selection mechanism to couple the digital signal from the first scaler to the summer or to couple the digital signal from the second scaler to the summer, and the second control signal directs the second selection mechanism to couple the digital signal from the third scaler to the summer or to couple the digital signal from the fourth scaler to the summer, and
   wherein the first control signal depends on a first control value associated with the first bit when the first bit is at the input to the first delay element.

2. A finite-duration impulse response filter according to claim 1 further comprising:
   a second delay element, coupled to an output of the first delay element in the delay line; and
   a third circuit, coupled to the delay line at an output to the second delay element, having:
      a fifth scaler;
      a sixth scaler; and
      a third selection mechanism, coupled between the fifth scaler and the sixth scaler, controlled by a third control signal;
   wherein the summer is also coupled to the third circuit, and
   wherein the third control signal directs the third selection mechanism to couple the digital signal from the fifth scaler to the summer or to couple the digital signal from the sixth scaler to the summer.

3. A finite-duration impulse response filter according to claim 1 wherein the second control signal depends on the first control value associated with the first bit when the first bit is at the output to the first delay element.

4. A finite-duration impulse response filter according to claim 1 wherein the first control signal depends on a second control value associated with the second bit when the second bit is at the input to the first delay element.

5. A finite-duration impulse response filter according to claim 4 wherein the second control signal depends on the second control value associated with the second bit when the second bit is at the output to the first delay element.

6. A finite-duration impulse response filter according to claim 1 wherein the first scaler is coupled to the delay line at the input to the first delay element.

7. A finite-duration impulse response filter according to claim 6, wherein the second scaler is coupled to the delay line at the input to the first delay element.

8. A finite-duration impulse response filter according to claim 7, wherein the first selection mechanism is coupled to the summer.

9. A digital filter with adaptive coefficients comprising:
   an input for receiving a digital input signal having a first control value associated with a first portion of the digital input signal;
   a first delay element, coupled to the input, for time-delaying the digital input signal;
   a first set, coupled to the input, having a first plurality of coefficient scalers;
   a second set, coupled to an output of the first delay element, having a second plurality of coefficient scalers;
   a summer;
   a first selection mechanism, coupled to the first set, for coupling one of the first plurality of coefficient scalers, depending on the first control value, from the input to the summer when the first portion of the digital input signal is coupled to the first set; and
   a second selection mechanism, coupled to the second set, for coupling one of the second plurality of coefficient scalers, depending on the first control value, from the output of the first delay element to the summer when the first portion of the digital input signal is coupled to the second set.

10. A digital filter with adaptive coefficients according to claim 9, wherein the digital filter is a finite-duration impulse response filter.

11. A digital filter with adaptive coefficients according to claim 9, wherein one of the first plurality of coefficient scalers represents an uncompensated impulse response coefficient and another of the first plurality of coefficient scalers represents a compensated impulse response coefficient.

12. A digital filter with adaptive coefficients according to claim 11, wherein one of the second plurality of coefficient scalers represents an uncompensated impulse response coefficient and another of the second plurality of coefficient scalers represents a compensated impulse response coefficient.

13. A digital filter with adaptive coefficients according to claim 9, wherein the digital input signal also has a second control value associated with a second portion of the digital input signal; and the first selection mechanism couples one of the first plurality of coefficient scalers, depending on the second control value, from the input to the summer when the second portion of the digital input signal is coupled to the first set; and the second selection mechanism couples one of the second plurality of coefficient scalers, depending on the second control value, from the output of the first delay element to the summer when the second portion of the digital input signal is coupled to the second set.

14. A digital filter with adaptive coefficients according to claim 9 further comprising:
   a second delay element, coupled to the output of the first delay element, for further time-delaying the digital input signal;
   a third set, coupled to an output of the second delay element, having a third plurality of coefficient scalers; and
   a third selection mechanism, coupled to the third set, for coupling one of the third plurality of coefficient scalers, depending on the first control value, from the output of the second delay element to the summer.

15. A digital filter with adaptive coefficients according to claim 14, wherein one of the third plurality of coefficient scalers represents an uncompensated impulse response coefficient and another of the third plurality of coefficient scalers represents a compensated impulse response coefficient.

16. A digital filter with adaptive coefficients according to claim 14, wherein the digital input signal also has a second control value associated with a second portion of the digital input signal; and the third selection mechanism couples one of the third plurality of coefficient scalers, depending on the second control value, from the output of the second delay element to the summer when the second portion of the digital input signal is coupled to the third set.

17. A method for filter a digital input signal comprising the steps of:

receiving a digital input signal having first control value associated with a first portion of the digital input signal;

selecting a first coefficient scaler from a first plurality of coefficient scalers depending on the first control value when the digital input signal is at an input to a coefficient scalar circuit;

scaling the first portion of the digital input signal using the first coefficient scaler to create a first scaled signal;

delaying the digital input signal;

selecting a second coefficient scaler from a second plurality of coefficient scalers depending on the first control value;

scaling the first portion of the digital input signal using the second coefficient scaler to create a second scaled signal; and summing the second scaled signal with the first scaled signal to create an output signal.

18. A method for filtering a digital input signal according to claim 17 further comprising the steps of:

further delaying the digital input signal;

selecting a third coefficient scaler from a third plurality of coefficient scalers depending on the first control value;

scaling the first portion of the digital input signal using the third coefficient scaler to create a third scaled signal; and summing the third scaled signal with the second set scaled signal and the first scaled signal to create an output signal.

* * * * *